US009482417B2

(12) United States Patent
Hirano et al.

(10) Patent No.: US 9,482,417 B2
(45) Date of Patent: Nov. 1, 2016

(54) ILLUMINATION DEVICE

(75) Inventors: Akihiro Hirano, Hyogo (JP); Noboru Miyakawa, Osaka (JP); Ryusuke Kotera, Osaka (JP); Satoshi Fukano, Nara (JP); Masashi Takeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 498 days.

(21) Appl. No.: 13/561,475

(22) Filed: Jul. 30, 2012

(65) Prior Publication Data

US 2013/0070467 A1 Mar. 21, 2013

(30) Foreign Application Priority Data

Sep. 21, 2011 (JP) ................................ 2011-205662

(51) Int. Cl.
*B60Q 1/44* (2006.01)
*F21V 21/34* (2006.01)
*F21Y 105/00* (2016.01)

(52) U.S. Cl.
CPC ............ *F21V 21/34* (2013.01); *F21Y 2105/00* (2013.01); *F21Y 2115/20* (2016.08)

(58) Field of Classification Search
CPC ...... F21V 21/04; F21V 33/006; F21V 14/02; F21V 17/04; F21V 19/004; F21V 21/14; F21V 23/005; F21V 23/006; F21V 7/005; F21V 21/08; F21V 23/007; F21V 5/007; F21V 14/04; F21V 19/00; F21V 19/0045; F21V 21/02; F21V 21/049; F21V 21/34; F21V 19/003; F21V 19/0035; F21V 21/03; F21V 19/0075; F21K 9/17; F21K 9/30; F21Y 2105/006; F21Y 2113/00; F21Y 2103/006; F21Y 2115/20; F21Y 2105/00; F21S 8/026; F21S 8/04; F21S 2/005; F21S 8/02; F21S 8/06; F21S 8/033; F21S 8/046; F21S 2/00; F21S 4/008; F21S 8/03; F21S 4/003; F21S 9/022; F21S 8/031; F21S 6/003; F21S 8/024; F21W 2121/00; F21W 2131/402; G02B 6/0035; G02B 6/0068; G02B 6/0095
USPC .................. 257/40, 43, 88; 438/104, 29, 46; 252/500, 301.16
See application file for complete search history.

(56) References Cited

U.S. PATENT DOCUMENTS 5,775,016 A * 7/1998 Chien .............................. 40/544
6,124,672 A * 9/2000 Burke ........................... 313/506
(Continued)

FOREIGN PATENT DOCUMENTS

CN 2131007 4/1993
CN 201302113 9/2009
(Continued)

OTHER PUBLICATIONS

Search report from E.P.O., mail date is Nov. 28, 2012.
(Continued)

*Primary Examiner* — Stephen F Husar
*Assistant Examiner* — Danielle Allen
(74) *Attorney, Agent, or Firm* — Greenblum & Bernstein P.L.C.

(57) ABSTRACT

An illumination device includes a light emitting panel and a device body to which the light emitting panel is detachably attached. The light emitting panel has a rear surface serving as a first curved surface. The device body has a surface serving as a second curved surface conforming to the first curved surface. An attachment portion for attaching/detaching the light emitting panel to/from the device body to slide along the first curved surface or the second curved surface is provided on one of the rear surface of the light emitting panel facing the device body and surface of the device body facing the light emitting panel. A groove portion for enabling the attachment portion to slide is provided on the other of the rear surface of the light emitting panel facing the device body and the surface of the device body facing the light emitting panel.

17 Claims, 13 Drawing Sheets

(56) References Cited

U.S. PATENT DOCUMENTS

| | | | | |
|---|---|---|---|---|
| 6,833,667 | B2 | 12/2004 | Hamano et al. | |
| 8,057,082 | B2 * | 11/2011 | Seabrook | F21V 5/04 174/16.3 |
| 8,593,061 | B2 * | 11/2013 | Yamada | H01L 27/3293 313/503 |
| 2009/0213573 | A1 | 8/2009 | Furukawa et al. | |
| 2012/0002427 | A1 * | 1/2012 | Moon et al. | 362/382 |
| 2012/0008315 | A1 * | 1/2012 | Simon et al. | 362/217.13 |

FOREIGN PATENT DOCUMENTS

| | | |
|---|---|---|
| CN | 101561117 | 10/2009 |
| CN | 102142514 | 8/2011 |
| CN | 102168822 | 8/2011 |
| EP | 0793056 | 9/1997 |
| EP | 1596638 | 11/2005 |
| GB | 2263331 | 7/1993 |
| JP | 2004-031155 | 1/2004 |
| JP | 2007-250302 | 9/2007 |
| JP | 2008-084555 | 4/2008 |
| JP | 2008-163685 | 7/2008 |
| JP | 2009-200011 | 9/2009 |
| JP | 2010-009886 | 1/2010 |

OTHER PUBLICATIONS

Office Action issued by E.P.O. patent office in E.P.O. Patent Application No. 12178955.6, dated Nov. 26, 2015.

JAPAN Office action in JP No. 2011-205662, mailed Feb. 24, 2015 and English Summary.

Office Action issued in CHINA Counterpart Patent Appl. No. 201210276090.8, dated Jun. 25, 2015 , along with an English translation thereof.

Office Action issued in CHINA Counterpart Patent Appl. No. 201210276090.8, dated Jan. 28, 2015 , along with an English translation thereof.

* cited by examiner

ILLUMINATION DEVICE

FIELD OF THE INVENTION

The present invention relates to an illumination device.

BACKGROUND OF THE INVENTION

Conventionally, there is proposed a light-emitting-panel-type illumination device arranged on a ceiling (see, e.g., Japanese Patent Application Publication No. 2007-250302). As shown in FIG. 12, the light-emitting-panel-type illumination device includes a flat light emitting panel 61 for radiating light downward from the front surface 61*a* thereof, a housing 63 for accommodating the light emitting panel 61 by covering the rear surface 61*b* of the light emitting panel 61 and a holder member 62 arranged within the housing 63 to hold the light emitting panel 61.

The light emitting panel 61 includes a substrate (not shown), an organic EL layer (not shown) having a first electrode layer, an organic light emitting layer and a second electrode layer formed one above another on the substrate, a first seal member (not shown) and a second seal member (not shown). The first seal member and the second seal member serve to hermetically seal the substrate and the organic light emitting layer. The lower surface of the substrate makes up the front surface 61*a* of the light emitting panel 61.

The housing 63, which is attached to the ceiling 70, includes a hollow portion 64 opened downward and a flange portion 65 extending outward from the peripheral edge of the opening of the hollow portion 64. In the bottom wall of the hollow portion 64, there are provided a pivotal supporting portion 66 for swingably supporting the holder member 62 and an engaged portion 67 for detachably fixing the holder member 62 within the hollow portion 64.

The holder member 62 includes a pivotal supported portion 68 rotatably supported by the pivotal supporting portion 66 of the housing 63. The holder member 62 further includes an engaging portion 69 removably engaging with the engaged portion 67 of the housing 63. Japanese Patent Application Publication No. 2007-250302 also mentions about the fact that the holder member 62 is hooked by a jig (not shown) and is forcibly pulled downward in order to release the engagement between the coupling portion 69 and the coupled portion 67.

In the light-emitting-panel-type illumination device shown in FIG. 12, however, the jig for releasing the engagement between the coupling portion 69 of the holder member 62 and the coupled portion 67 of the housing 63 is required in order to replace the light emitting panel 61. In the light-emitting-panel-type illumination device, the holder member 62 needs to be hooked by the jig and forcibly pulled downward in order to release the engagement between the coupling portion 69 and the coupled portion 67. This makes it difficult to replace the light emitting panel 61.

SUMMARY OF THE INVENTION

In view of the above, the present invention provides an illumination device capable of enhancing the ease of a work for attaching and detaching a light emitting panel to and from a device body.

In accordance with an embodiment of the present invention, there is provided an illumination device, including: a light emitting panel having an electroluminescence element; and a device body to which the light emitting panel is detachably attached, wherein the light emitting panel has a rear surface facing the device body and serving as a first curved surface, the device body having a surface facing the light emitting panel and serving as a second curved surface conforming to the first curved surface, an attachment portion for attaching/detaching the light emitting panel to/from the device body to slide along the first curved surface or the second curved surface is provided on one of the rear surface of the light emitting panel facing the device body and the surface of the device body facing the light emitting panel, and a groove portion for enabling the attachment portion to slide is provided on the other of the rear surface of the light emitting panel facing the device body and the surface of the device body facing the light emitting panel.

In the device, a first terminal for feeding electric power to the light emitting panel may be provided in one of the attachment portion and the groove portion, and a second terminal electrically connectable to the first terminal may be provided in the other of the attachment portion and the groove portion. The first terminal may be arranged in a position where the first terminal can be electrically connected to the second terminal when the light emitting panel is attached to the device body.

The light emitting panel may have cutout portions formed in sliding-direction end portions of the light emitting panel.

In the device, a ridge may be provided on one of the first curved surface of the light emitting panel and the second curved surface of the device body, and a valley for engaging with the ridge when the light emitting panel may be attached to the device body being provided on the other of the first curved surface of the light emitting panel and the second curved surface of the device body.

With such configuration, it is possible to enhance the ease of a work for attaching and detaching a light emitting panel to and from a device body.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

First Embodiment

Figure 1:
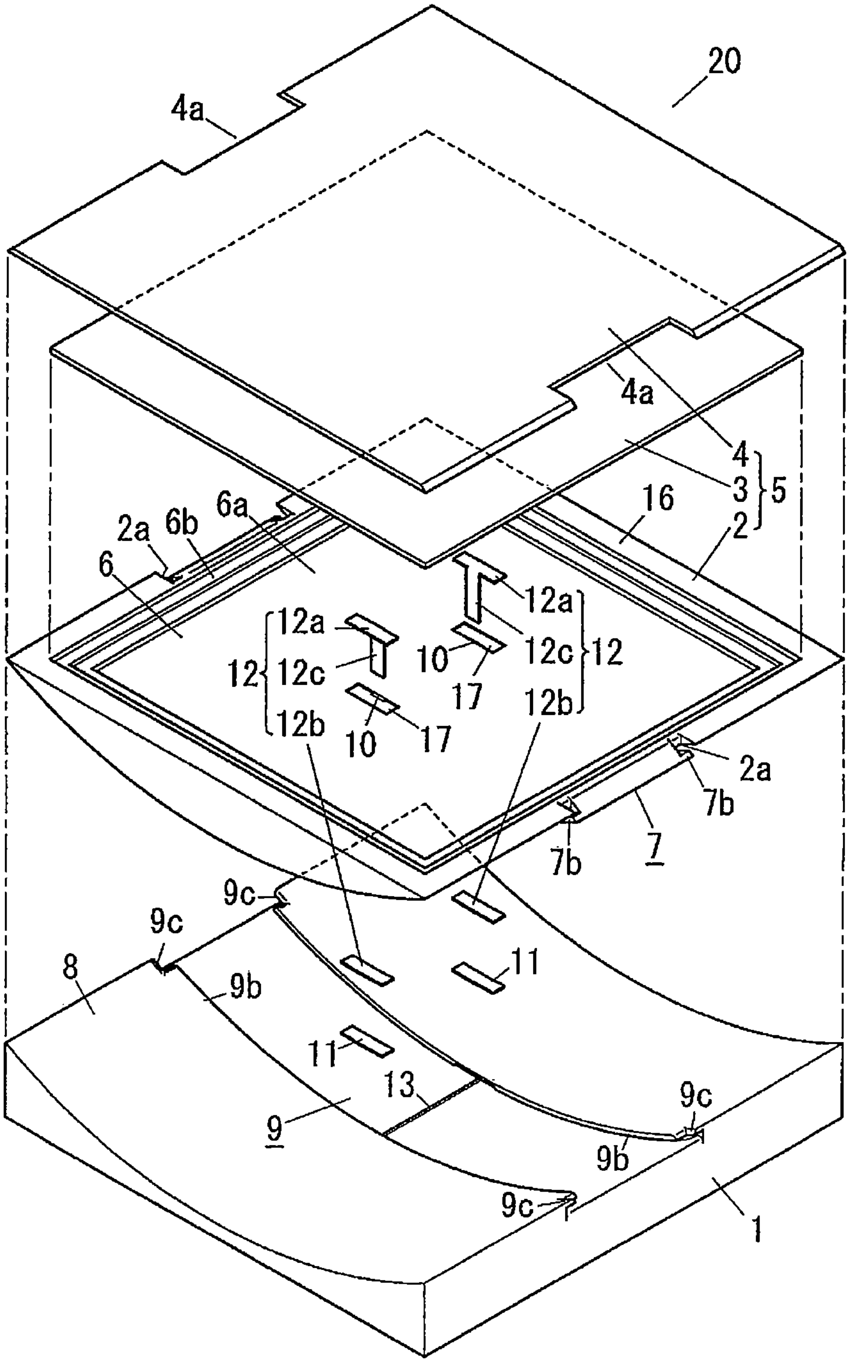
FIG. 1 is a schematic exploded perspective view showing an illumination device according to a first embodiment.
Figure 2:
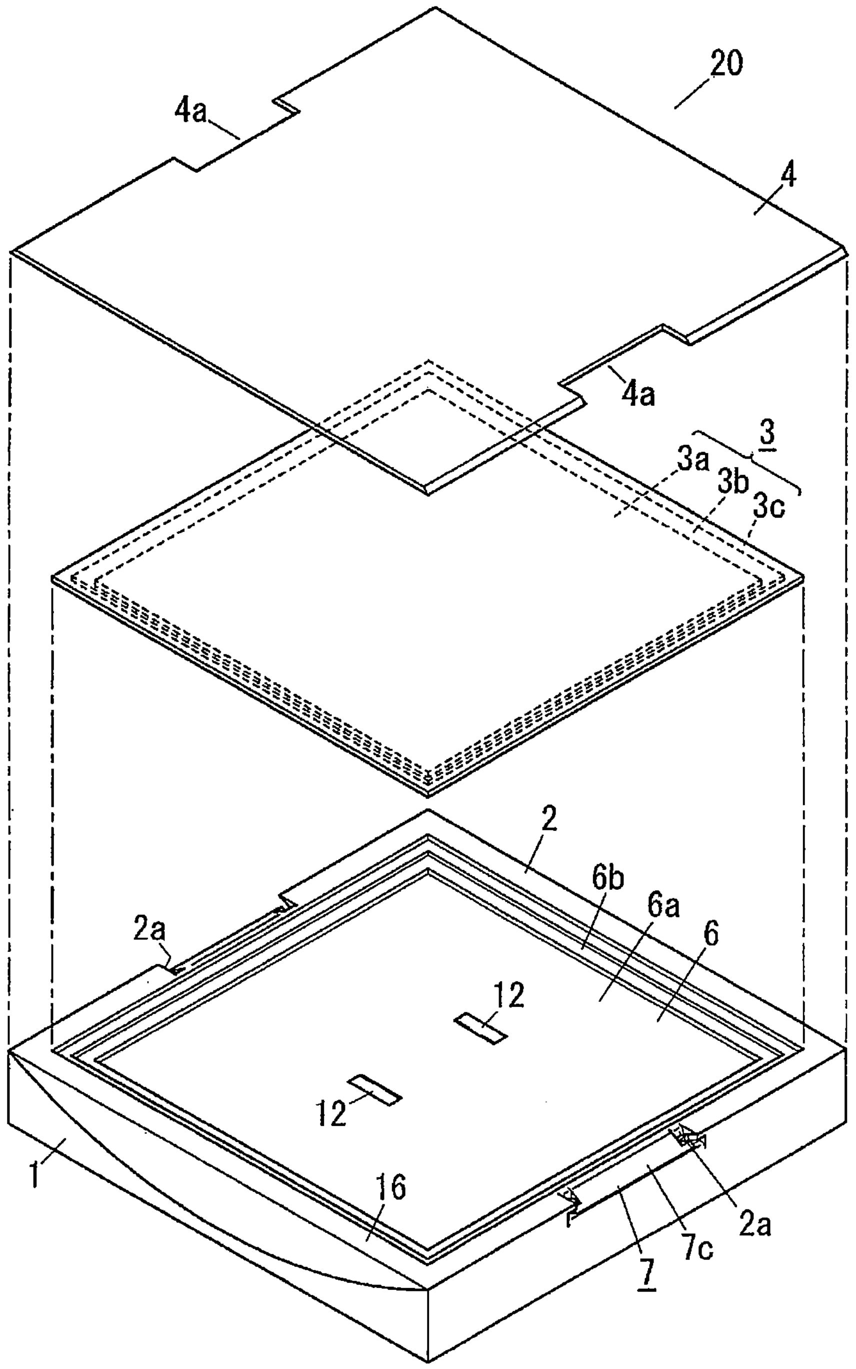
FIG. 2 is a schematic exploded perspective view of the illumination device, illustrating a state that a light emitting panel is partially attached to a device body.
Figure 3:
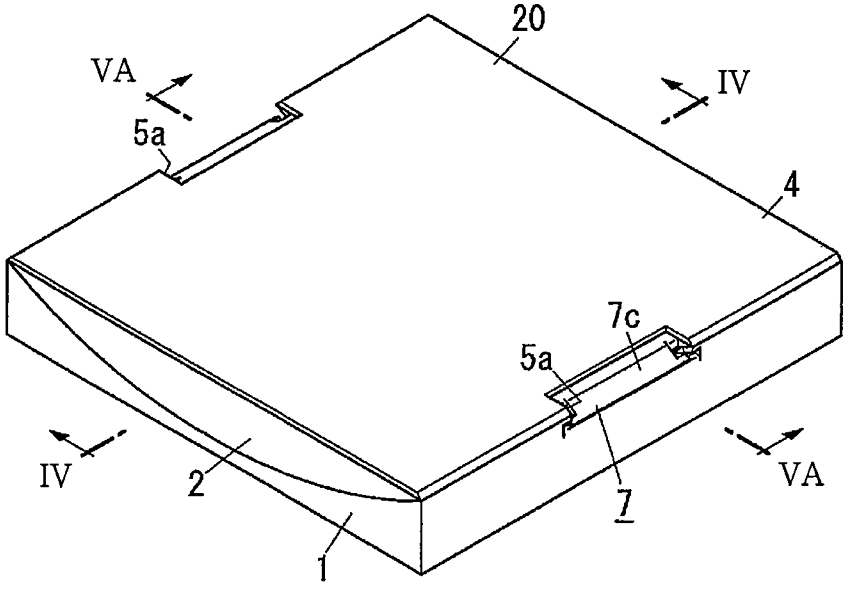
FIG. 3 is a perspective view of the illumination device.

An illumination device according to a first embodiment will now be described with reference to FIGS. 1 through 10 which form a part hereof.

The illumination device 20 of the present embodiment includes a light emitting panel 5 having an electroluminescence element 3, and a box-shaped device body 1 to which the light emitting panel 5 can be detachably attached. While an organic electroluminescence element is used as the electroluminescence element 3 in the illumination device 20 of the present embodiment, the present invention is not limited thereto. An inorganic electroluminescence element may be used as the electroluminescence element 3. While the color of the light emitted by the electroluminescence element 3 is white in the illumination device 20 of the present embodiment, the present invention is not limited thereto.

The electroluminescence element 3 is formed to have a rectangular perimeter.

The electroluminescence element 3 includes a plate-like circuit board 3*a* (having a rectangular plate shape in the present embodiment), a plate-like light emitter 3*b* (having a rectangular plate shape in the present embodiment) arranged on one surface (the upper surface, in FIG. 4) of the circuit board 3*a* and provided with a light emitting layer (not shown), a plate-like glass substrate 3*c* (having a rectangular plate shape in the present embodiment) arranged on one surface (the upper surface, in FIG. 4) of the light emitter 3*b*. In the illumination device 20 of the present embodiment, a first electrode (e.g., an anode made of a transparent conductive film) not shown in the drawings is provided on one surface of the light emitter 3*b*. A second electrode (e.g., a cathode) not shown in the drawings is provided on the other surface (the lower surface, in FIG. 4) of the light emitter 3*b*. The perimeter of the light emitter 3*b* is smaller than the perimeter of the glass substrate 3*c*. The perimeter of the circuit board 3*a* is smaller than the perimeter of the light emitter 3*b*.

A pair of electrode portions (not shown) electrically connected to the first electrode and the second electrode of the light emitter 3*b* is arranged on the other surface (the lower surface, in FIG. 4) of the circuit board 3*a*.

The light emitting panel 5 includes the electroluminescence element 3 set forth above and a panel body 2 for receiving the electroluminescence element 3. The panel body 2 can be detachably attached to the device body 1. The light emitting panel 5 further includes a cover 4 attached to the panel body 2 so as to close the light extraction surface (the upper surface in FIG. 1) of the electroluminescence element 3 received in the panel body 2. In this regard, the cover 4 is transparent.

The light emitting panel 5 is formed to have a rectangular perimeter when seen in a plan view.

The panel body 2 is made of an insulating material (e.g., a synthetic resin). The panel body 2 has a rear surface 15 (see FIGS. 6A, 6B, and 9) facing the device body 1. The rear surface 15 of the panel body 2 is formed into a curved surface bulging toward the device body 1. In a nutshell, the rear surface 15 of the light emitting panel 5 facing the device body 1 is formed into a curved surface. In the illumination device 20 of the present embodiment, the rear surface 15 of the panel body 2 constitutes a first curved surface.

The panel body 2 has a front surface 16 facing the cover 4 and a hollow portion 6 formed on the front surface 16. The hollow portion 6 is capable of receiving the electroluminescence element 3. The hollow portion 6 is opened to have a rectangular inner periphery when seen in a plan view. The depth of the hollow portion 6 is set a little larger than the thickness of the electroluminescence element 3 (see FIG. 2). A positioning portion 6*b* for positioning the electroluminescence element 3 is formed in the inner periphery of the hollow portion 6. In this connection, the shape of the positioning portion 6*b* corresponds to the shape of the outer periphery of the electroluminescence element 3 (see FIG. 2). In the illumination device 20 of the present embodiment, it is therefore possible to position the electroluminescence element 3 within the hollow portion 6 of the panel body 2.

The cover 4 is made of a light-transmitting material (e.g., an acryl resin or a glass) and is formed into a plate-like shape (a rectangular plate shape in the present embodiment). The cover 4 is arranged on the front surface 16 of the panel body 2. In the illumination device 20 of the present embodiment, an adhesive agent or an adhesive tape is used as a means for attaching the cover 4 to the panel body 2. However, the means for attaching the cover 4 to the panel body 2 is not limited thereto.

In the illumination device 20 of the present embodiment, an attachment portion 7 for attaching/detaching the light emitting panel 5 to/from the device body 1 in such a manner as to slide along the rear surface 15 of the panel body 2 is provided on the rear surface 15 of the panel body 2. Briefly, in the illumination device 20 of the present embodiment, the attachment portion 7 for attaching/detaching the light emitting panel 5 to/from the device body 1 in such a manner as to slide along the first curved surface or the second curved surface to be described later is provided on the surface of the light emitting panel 5 facing the device body 1.

The attachment portion 7 is formed to protrude from the rear surface 15 of the panel body 2 toward the device body 1. In the illumination device 20 of the present embodiment, the protruding dimension (the thickness) of the attachment portion 7 is uniform.

The attachment portion 7 includes plate-like slide pieces 7*b* (having a rectangular plate shape in the present embodiment) protruding from the opposite surfaces of the attachment portion 7 in the transverse direction orthogonal to the sliding direction of the light emitting panel 5. In the illumination device 20 of the present embodiment, the slide pieces 7*b* are arranged in a spaced-apart relationship with the rear surface 15 of the panel body 2.

The device body 1 has a surface 8 facing the light emitting panel 5. The surface 8 of the device body 1 is formed into a curved surface conforming to the rear surface 15 of the panel body 2. In the illumination device 20 of the present embodiment, the rear surface 15 of the panel body 2 is formed into a convex curved shape and the surface 8 of the device body 1 is formed into a concave curved shape. In the illumination device 20 of the present embodiment, the surface 8 of the device body 1 constitutes a second curved surface.

In the illumination device 20 of the present embodiment, a groove portion 9 for enabling the attachment portion 7 of the panel body 2 to slide is formed on the surface 8 of the device body 1. Briefly, in the illumination device 20 of the present embodiment, the groove portion 9 for enabling the attachment portion 7 of the light emitting panel 5 to slide is formed on the surface of the device body 1 facing the light emitting panel 5.

The groove portion 9 is formed on the surface 8 of the device body 1 to extend along the sliding direction of the attachment portion 7 of the light emitting panel 5. The opposite ends of the groove portion 9 in the sliding direction of the light emitting panel 5 are opened. This makes it possible to insert and remove the attachment portion 7 of the panel body 2 into and from the groove portion 9. More specifically, the groove portion 9 includes openings 9*c* formed at the opposite ends thereof in the sliding direction of the light emitting panel 5. The groove portion 9 further includes protrusions 9*b* protruding inward from the transverse opposite side surfaces of the groove portion 9. The protrusions 9*b* can make sliding contact with the slide pieces 7*b* of the attachment portion 7 of the panel body 2. In the illumination device 20 of the present embodiment, the depth of the groove portion 9 is set a little larger than the thickness of the attachment portion 7. In the illumination device 20 of the present embodiment, it is therefore possible to insert, remove and slide the attachment portion 7 of the light emitting panel 5 with respect to the surface 8 (the second curved surface) of the device body 1. In the illumination device 20 of the present embodiment, the slide pieces 7*b* of the attachment portion 7 of the light emitting panel 5 can be inserted into the groove portion 9 of the device body 1. Thus the protrusions 9*b* of the groove portion 9 can hold the slide pieces 7*b* of the attachment portion 7. This makes it possible to attach the light emitting panel 5 to the device body 1. In the illumination device 20 of the present embodiment, the attachment portion 7 of the light emitting panel 5 can be slid along the second curved surface in a state that the light emitting panel 5 is attached to the device body 1. It is therefore possible to remove the light emitting panel 5 from the device body 1.

The device body 1 includes first terminals 11 (see FIGS. 4, 5A, and 5B) for feeding electric power to the light emitting panel 5. The first terminals 11 are arranged on the opposite surfaces of the respective protrusions 9*b* from the light emitting panel 5. Briefly, in the illumination device 20 of the present embodiment, the first terminals 11 for feeding electric power to the light emitting panel 5 is provided in the groove portion 9.

The respective first terminals 11 are electrically connected to a power supply unit (not shown). The power supply unit is arranged within the device body 1 and is capable of feeding electric power to the light emitting panel 5. The power supply unit is electrically connected to a commercial power source via a power supply cable (not shown). The power supply unit includes an AC-DC converter (not shown) for converting an alternating current voltage supplied from the commercial power source to a direct current voltage.

The panel body 2 includes a pair of second terminals 12 electrically connectable to the first terminals 11 of the device body 1.

Each of the second terminals 12 includes a connector portion 12*a* electrically connectable to the electrode portions arranged on the other surface of the circuit board 3*a* of the electroluminescence element 3, a terminal portion 12*b* electrically connectable to each of the first terminals of the device body 1 and a connector piece 12*c* for interconnecting the connector portion 12*a* and the terminal portion 12*b*.

Figure 4:
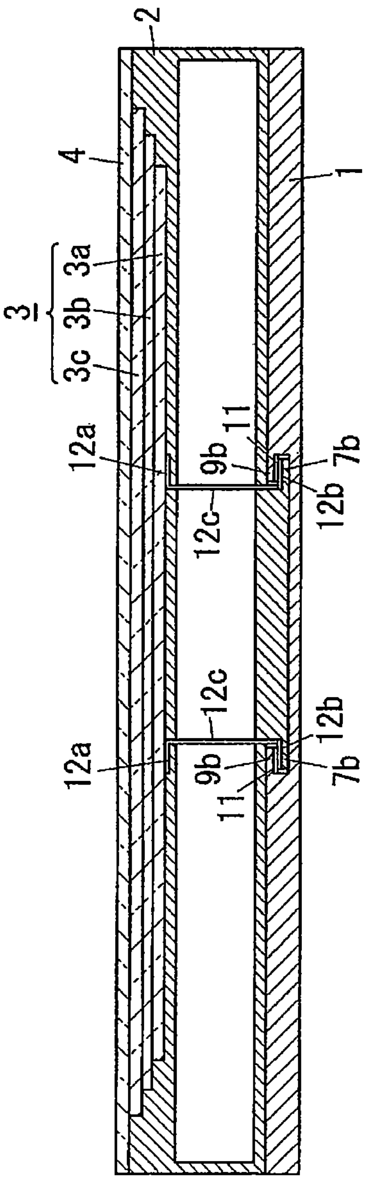
FIG. 4 is a section view of the illumination device taken along line IV-IV in FIG. 3.
Figure 5A:
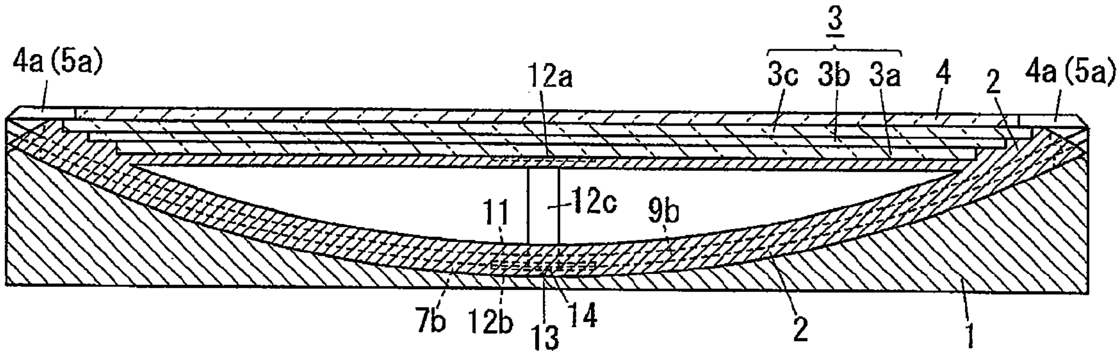
FIG. 5A is a section view of the illumination device taken along line VA-VA in FIG. 3.
Figure 5B:
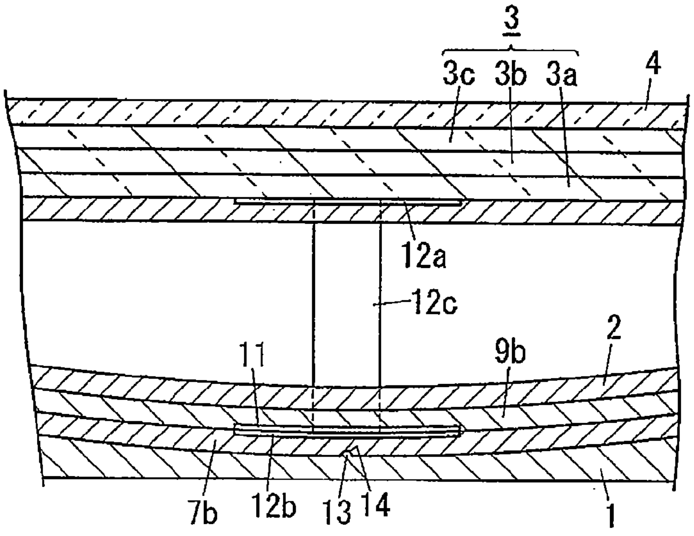
FIG. 5B is an explanatory view explaining the engagement between a raised portion and a recessed portion.
Figure 6A:
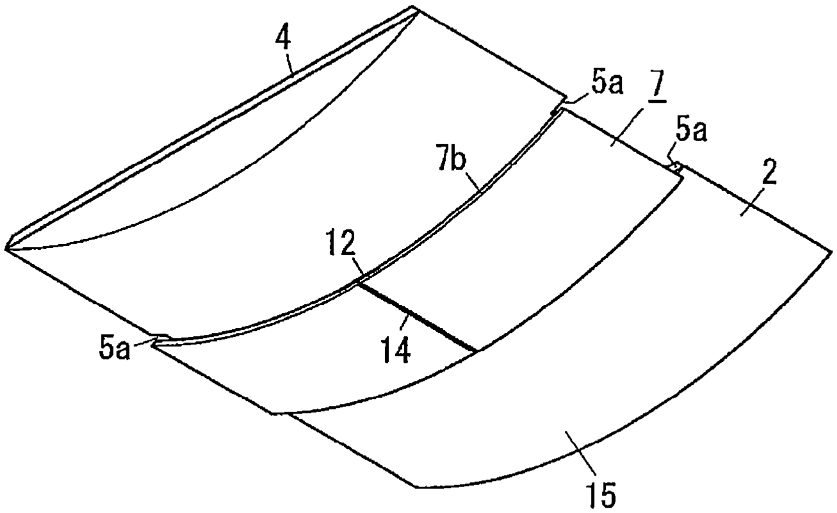
FIG. 6A is a perspective view showing a light emitting panel of the illumination device.
Figure 6B:
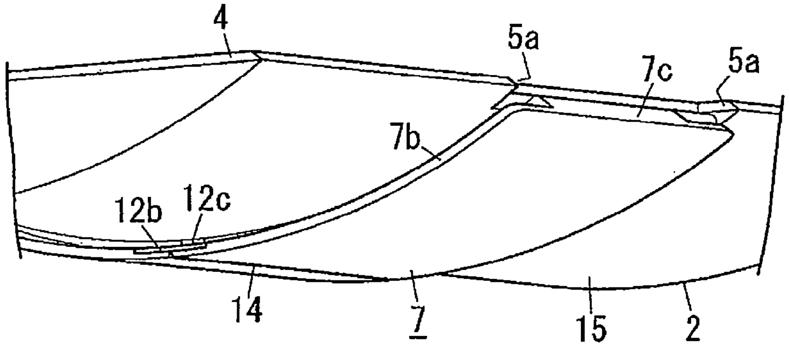
FIG. 6B is a partially enlarged view of the light emitting panel shown in FIG. 6A.
Figure 7A:
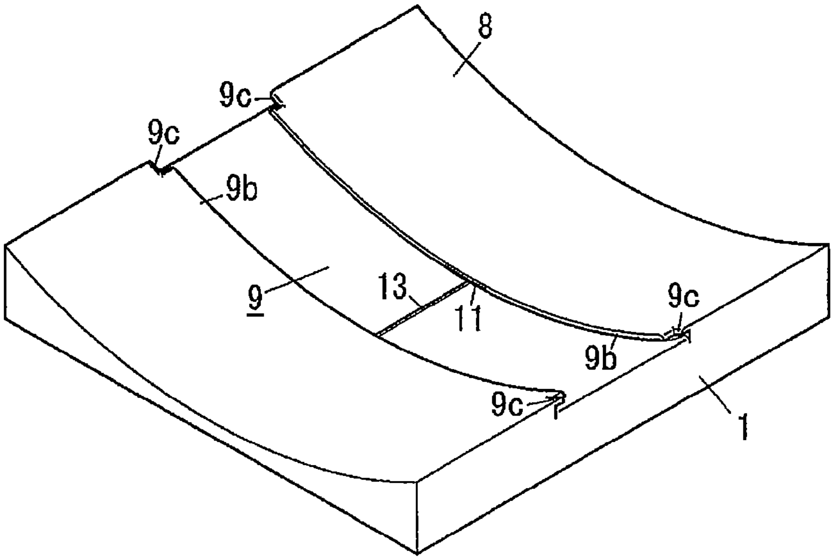
FIG. 7A is a perspective view showing a device body of the illumination device.
Figure 7B:
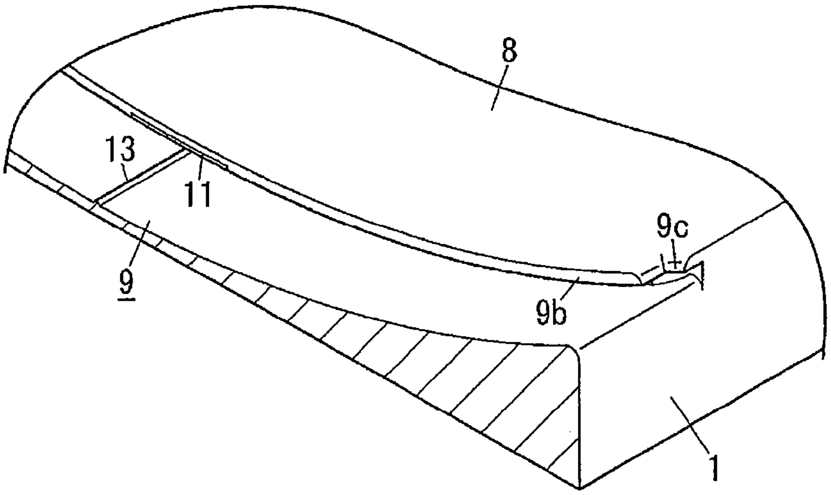
FIG. 7B is a partially enlarged view of the device body shown in FIG. 7A.

The terminal portions 12*b* of the second terminals 12 are arranged on the opposite surfaces of the slide pieces 7*b* of the attachment portion 7 from the device body 1 (see FIGS. 4, 5A, and 5B). Briefly, in the illumination device 20 of the present embodiment, the second terminals 12 electrically connectable to the first terminals 11 are provided in the attachment portion 7.

In this regard, the first terminals 11 are arranged in such positions where the first terminals 11 can be electrically connected to the second terminals 12 in a state that the light emitting panel 5 is attached to the device body 1. In the illumination device 20 of the present embodiment, the terminal portions 12*b* of the second terminals 12 are separately arranged on the opposite surfaces of the slide pieces 7*b* from the device body 1 in the central areas of the slide pieces 7*b* along the sliding direction of the light emitting panel 5. In the present embodiment, the first terminals 11 are separately arranged on the opposite surfaces of the protrusions 9*b* of the groove portion 9 from the light emitting panel 5 in the central areas of the protrusions 9*b* along the sliding direction of the light emitting panel 5. In other words, when the light emitting panel 5 is attached to the device body 1, the first terminals 11 are arranged in the positions corresponding to the terminal portions 12*b* of the second terminals 12. Briefly, in the illumination device 20 of the present embodiment, the first terminals 11 are arranged in such positions where the first terminals 11 can be electrically connected to the second terminals 12 in a state that the light emitting panel 5 is attached to the device body 1. In this regard, depressions 17 for receiving the connector portions 12*a* of the second terminals 12 are formed on the bottom surface 6*a* of the hollow portion 6 of the panel body 2 in the positions corresponding to the first terminals 11 when the light emitting panel 5 is attached to the device body 1. Insertion holes 10, into which the connector pieces 12*c* of the second terminals 12 are inserted, are formed in the bottom portions of the depressions 17.

In the illumination device 20 of the present embodiment, the first terminals 11 are arranged in such positions where the first terminals 11 can be electrically connected to the second terminals 12 in a state that the light emitting panel 5 is attached to the device body 1. It is therefore possible to feed electric power from the power supply unit of the device body 1 to the light emitting panel 5 when the light emitting panel 5 is attached to the device body 1.

In the illumination device 20 of the present embodiment, the terminal portions 12*b* of the second terminals 12 are separately arranged on the opposite surfaces of the slide pieces 7*b* of the attachment portion 7 from the device body 1 in the central areas of the slide pieces 7*b* along the sliding direction of the light emitting panel 5. However, the positions of the terminal portions 12*b* of the second terminals 12 are not limited thereto. The terminal portions 12*b* of the second terminals 12 may be arranged in any position as long as the terminal portions 12*b* of the second terminals 12 can be electrically connected to the first terminals 11 when the light emitting panel 5 is attached to the device body 1.

Hereinafter, a method of attaching and removing the light emitting panel 5 to and from the device body 1 in the illumination device 20 of the present embodiment will be described with reference to FIGS. 8A and 8B.

Figure 8A:
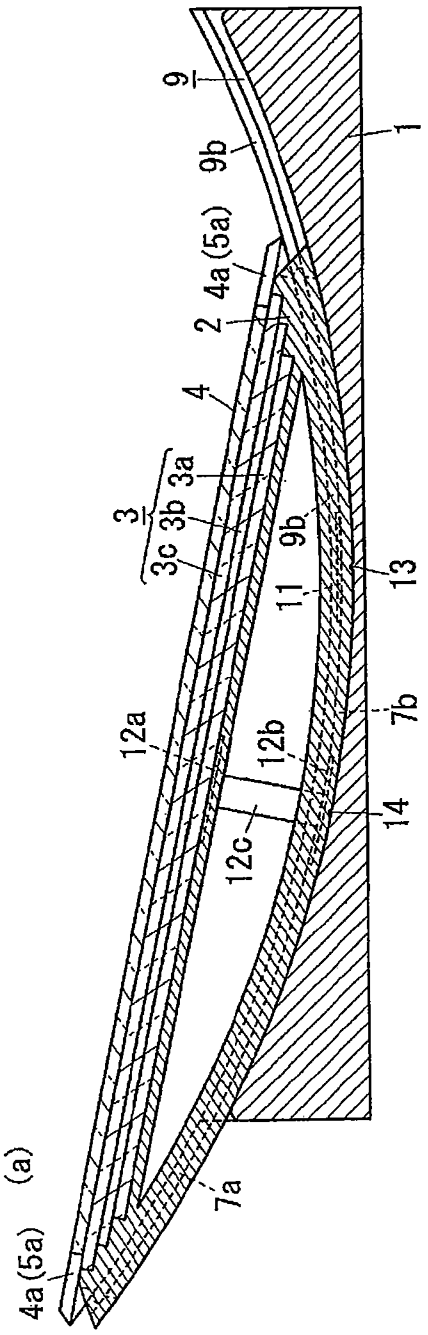
FIGS. 8A and 8B are explanatory views explaining how to attach and detach the light emitting panel to and from the device body in the illumination device.
Figure 8B:
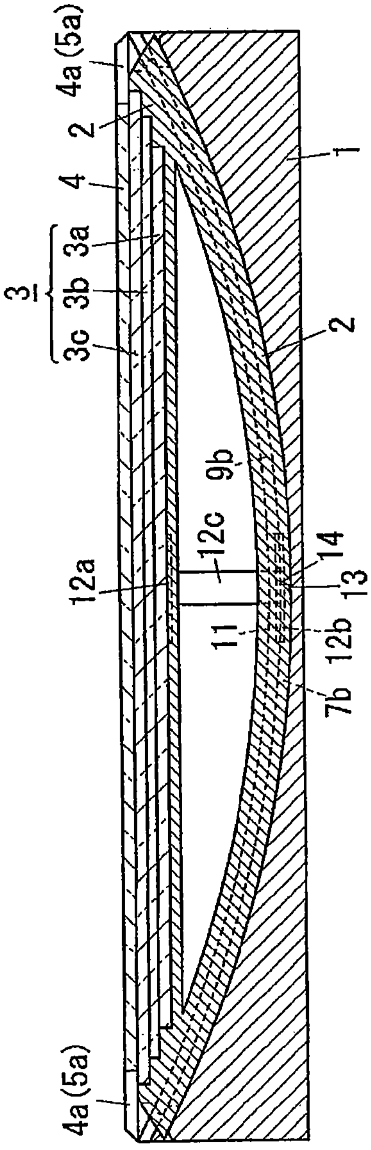
Figure 9A:
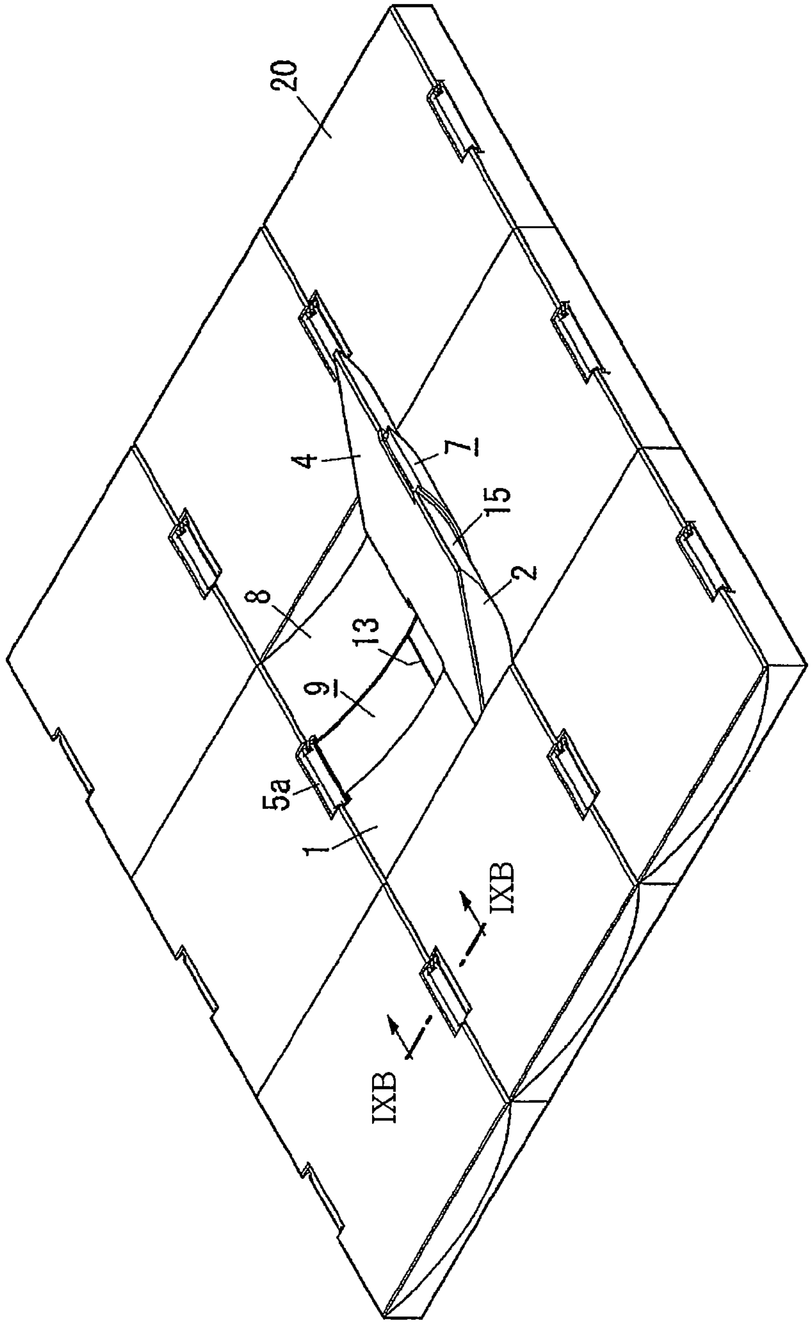
FIG. 9A is a perspective view illustrating a use example of the illumination device.
Figure 9B:
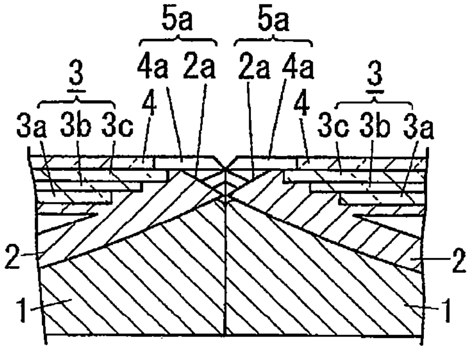
FIG. 9B is a section view taken along line IXB-IXB in FIG. 9A.
Figure 10:
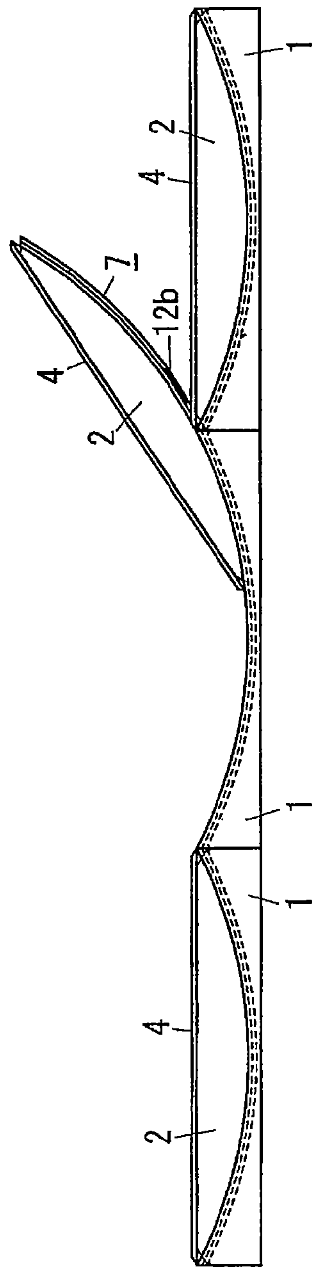
FIG. 10 is an explanatory view illustrating a use example of the illumination device in which the light emitting panel is detached from the device body.

In the illumination device 20 of the present embodiment, the attachment portion 7 of the light emitting panel 5 is inserted into the groove portion 9 from one of the openings 9*c* of the groove portion 9 of the device body 1 (see FIG. 8A). Then, the attachment portion 7 of the light emitting panel 5 is slid along the second curved surface. Consequently, the light emitting panel 5 can be attached to the device body 1 (see FIG. 8B). In the illumination device 20 of the present embodiment, when the light emitting panel 5 is attached to the device body 1, the terminal portions 12*b* of the second terminals 12 of the light emitting panel 5 are electrically connected to the first terminals 11 of the device body 1. This makes it possible to feed electric power from the power supply unit of the device body 1 to the light emitting panel 5.

In the illumination device 20 of the present embodiment, if a force acting in the direction perpendicular to the surface (the upper surface in FIG. 8B) of the cover 4 is applied to one end portion (the right end portion in FIG. 8B) of the light emitting panel 5 in the sliding direction in a state that the light emitting panel 5 is attached to the device body 1, the light emitting panel 5 is slid along the second curved surface. This enables a worker to grip the other end portion (the left end portion in FIG. 8A) of the light emitting panel 5. Thus the light emitting panel 5 can be removed from the device body 1.

In recent years, attention is paid to an organic electroluminescence element (hereinafter referred to as "organic EL element") as a light source of a next-generation illumination device. The organic EL element is still under a developing stage. In case where the organic EL element is used as a light source of an illumination device for houses or facilities, there is posed a problem in that the light emitting area of the organic EL element is small and the lifespan of the organic EL element is as short as ten thousand hours. In order to use a light emitting panel having organic EL elements (hereinafter referred to as "organic EL panel") as a light source of an illumination device, it is required that the light emitting area of organic EL elements be increased by arranging a plurality of organic EL panels on a single plane with no gap left therebetween.

In an illumination device having a plurality of organic EL panels arranged on a single plane with no gap left therebetween, however, it is difficult to remove one specific organic EL panel when one of the organic EL panels is not lighted due to failure or exhausted lifespan.

As a solution to this problem, it is preferred that cutout portions 5*a* (see FIGS. 3, 6A, 6B, 9A, and 9B) be formed in the sliding direction end portions of the light emitting panel 5. In the illumination device 20 of the present embodiment, the cover 4 includes first cutout portions 4*a* formed in the positions corresponding to the openings 9*c* of the groove portion 9 of the device body 1 when the light emitting panel 5 is attached to the device body 1. The panel body 2 includes second cutout portions 2*a* formed in the positions corresponding to the openings 9*c* of the groove portion 9 when the light emitting panel 5 is attached to the device body 1. In this regard, the attachment portion 7 of the panel body 2 has slant surfaces 7*c* (see FIGS. 2 and 3) formed in the end portions in the sliding direction of the light emitting panel 5. In the illumination device 20 of the present embodiment, the first cutout portions 4*a*, the second cutout portions 2*a* and the slant surfaces 7*c* make up the cutout portions 5*a*.

In the illumination device 20 of the present embodiment, the cutout portions 5*a* are formed in the sliding direction end portions of the light emitting panel 5. In case where a plurality of illumination devices 20 is arranged on one plane with no gap left therebetween, it is therefore possible to prevent the light emitting panel 5 from interfering with the adjoining illumination device 20 when removing only one of the light emitting panels 5 (see FIG. 10).

It is preferred that a ridge 13 protruding toward the light emitting panel 5 is formed on the surface 8 of the device body 1. It is also preferred that a valley 14 (see FIGS. 5A, 5B, 6A, 6B, 8A, and 8B) engaging with the ridge 13 of the device body 1 when the light emitting panel 5 is attached to the device body 1 is formed on the rear surface 15 of the panel body 2.

In the illumination device 20 of the present embodiment, the ridge 13 is arranged on the bottom surface of the groove portion 9. While the ridge 13 is arranged on the bottom surface of the groove portion 9 in the central area along the sliding direction of the light emitting panel 5, the position of the ridge 13 is not limited thereto. The ridge 13 may be arranged in any position as long as the ridge 13 can engage with the valley 14 of the light emitting panel 5 when the light emitting panel 5 is attached to the device body 1.

In the illumination device 20 of the present embodiment, the valley 14 is arranged on the surfaces of the slide pieces 7*b* of the attachment portion 7 facing the device body 1. In the illumination device 20 of the present embodiment, the valley 14 is arranged on the surfaces of the slide pieces 7*b* of the attachment portion 7 facing the device body 1 in the central area along the sliding direction of the light emitting panel 5. In other words, in the illumination device 20 of the present embodiment, the valley 14 is arranged in a position where the ridge 13 of the device body 1 can engage with the valley 13 when the light emitting panel 5 is attached to the device body 1. While the ridge 13 is arranged on, e.g., the bottom surface of the groove portion 9 in the illumination device 20 of the present embodiment, the position of the ridge 13 is not limited thereto. The ridge 13 may be arranged in any position on the surface 8 of the device body 1. While the valley 14 is arranged on, e.g., the surfaces of the slide pieces 7*b* of the attachment portion 7 facing the device body 1 in the illumination device 20 of the present embodiment, the position of the valley 14 is not limited thereto. The valley 14 may be arranged in any position on the rear surface 15 of the light emitting panel 5.

In the illumination device 20 of the present embodiment, the ridge 13 is formed on the surface 8 of the device body 1. The valley 14 engaging with the ridge 13 of the device body 1 when the light emitting panel 5 is attached to the device body 1 is formed on the rear surface 15 of the panel body 2. It is therefore possible to prevent misalignment of the light emitting panel 5 and the device body 1 when the light emitting panel 5 is attached to the device body 1. In the illumination device 20 of the present embodiment, when the light emitting panel 5 is attached to the device body 1, the ridge 13 of the device body 1 comes into engagement with the valley 14 of the light emitting panel 5, thereby giving a clicking sense to a worker. This enables a worker to recognize the right attachment of the light emitting panel 5 to the device body 1.

In the illumination device 20 of the present embodiment, the height of the ridge 13 is preferably set larger than the depth of the valley 14. In the illumination device 20 of the present embodiment, if the light emitting panel 5 is attached to the device body 1, the ridge 13 of the device body 1 pushes up the slide pieces 7*b* of the attachment portion 7 toward the light emitting panel 5 through the valley 14 of the light emitting panel 5 (see FIG. 5B). It is therefore possible to increase the contact pressure acting between the first terminals 11 of the device body 1 and the second terminals 12 of the light emitting panel 5, thereby enhancing the electric connection between the first terminals 11 and the second terminals 12.

While the ridge 13 is formed on the surface 8 of the device body 1 in the illumination device 20 of the present embodiment, the ridge 13 may be formed on the rear surface 15 of the light emitting panel 5. While the valley 14 is formed on the rear surface 15 of the light emitting panel 5 in the illumination device 20 of the present embodiment, the valley 14 may be formed on the surface 8 of the device body 1.

In the illumination device 20 of the present embodiment described above, the rear surface 15 of the light emitting panel 5 facing the device body 1 is formed as a first curved surface. The surface 8 of the device body 1 facing the light emitting panel 5 is formed as a second curved surface conforming to the first curved surface. The attachment portion 7 for attaching/detaching the light emitting panel 5 to/from the device body 1 to slide along the first curved surface or the second curved surface is provided on the surface of the light emitting panel 5 facing the device body 1. The groove portion 9 for enabling the attachment portion 7 to slide is provided on the surface of the device body 1 facing the light emitting panel 5. It is therefore possible to enhance the ease of a work for attaching and detaching the light emitting panel 5 to and from the device body 1.

Second Embodiment

Figure 11A:
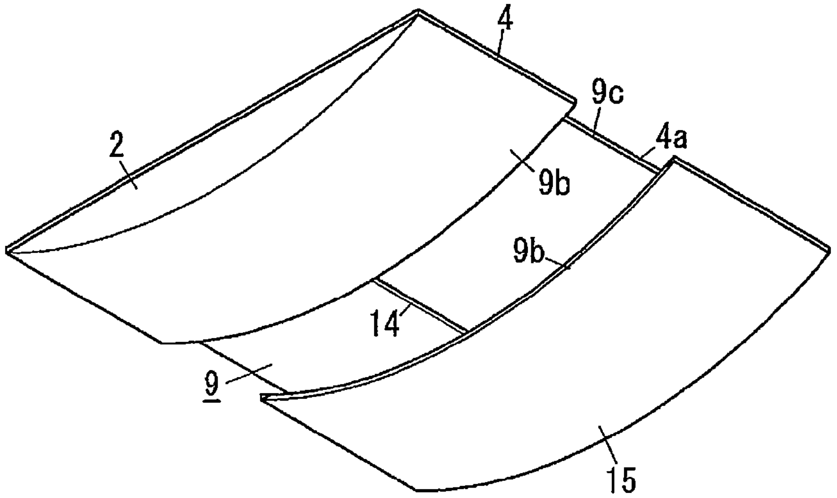
FIG. 11A is a perspective view showing a light emitting panel of an illumination device according to a second embodiment.
Figure 11B:
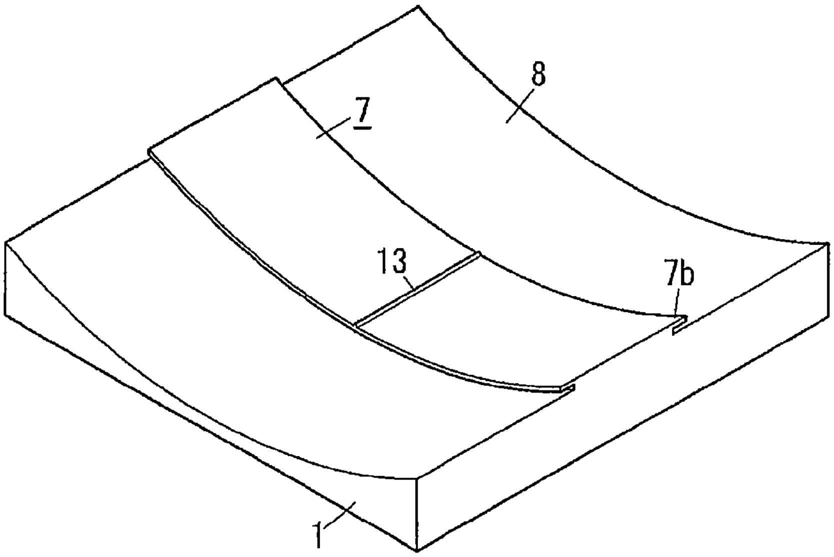
FIG. 11B is a perspective view showing a device body.
Figure 12A:
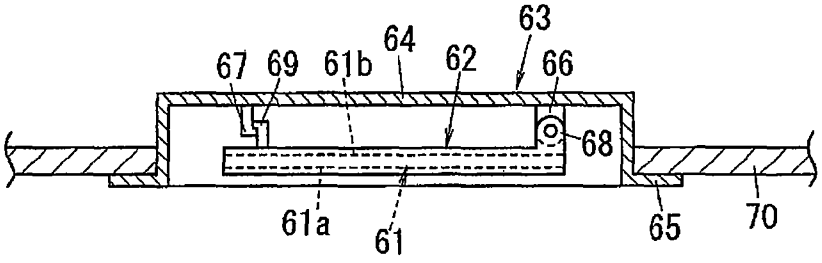
FIG. 12A is a section view of a conventional light-emitting-panel-type illumination device in which a holder member is fixed within a housing.
Figure 12B:
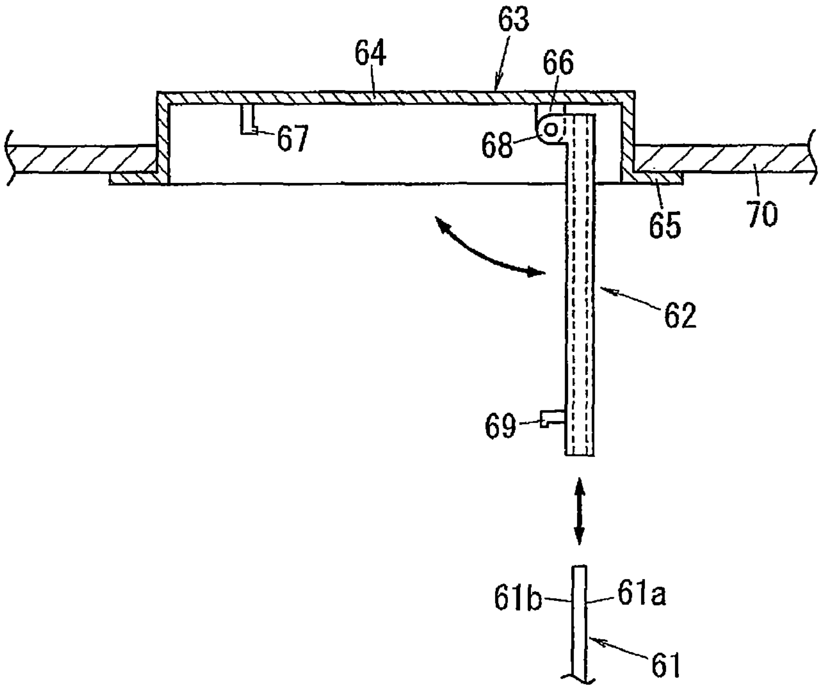
FIG. 12B is a section view of the conventional illumination device in which a light emitting panel is detached from the holder member.

An illumination device 20 according to a second embodiment will now be described with reference to FIGS. 11A and 11B.

The basic configuration of the illumination device 20 of the second embodiment remains the same as that of the first embodiment. The second embodiment differs from the first embodiment in that the attachment portion 7 is provided in the device body 1 and the groove portion 9 is provided in the light emitting panel 5. The same components as those of the first embodiment will be designated by like reference symbols with no description made thereon.

In the illumination device 20 of the present embodiment, the attachment portion 7 is provided on the surface 8 of the device body 1. Briefly, in the illumination device 20 of the present embodiment, the attachment portion 7 for attaching/detaching the light emitting panel 5 to/from the device body 1 to slide along the first curved surface or the second curved surface is provided on the surface of the device body 1 facing the light emitting panel 5. The attachment portion 7 is formed on the surface 8 of the device body 1 to extend along the sliding direction of the light emitting panel 5.

The device body 1 includes a pair of first terminals 11 arranged on the opposite surfaces of the slide pieces 7*b* of the attachment portion 7 from the light emitting panel 5. Briefly, in the illumination device 20 of the present embodiment, the first terminals 11 for feeding electric power to the light emitting panel 5 are provided in the attachment portion 7.

The first terminals 11 are provided in the transverse end portions of the attachment portion 7 on the opposite surfaces of the slide pieces 7*b* of the attachment portion 7 from the light emitting panel 5. In the illumination device 20 of the present embodiment, the first terminals 11 are separately arranged on the opposite surfaces of the slide pieces 7*b* of the attachment portion 7 from the light emitting panel 5 in the central areas of the slide pieces 7*b* along the sliding direction of the light emitting panel 5.

In the illumination device 20 of the present embodiment, the ridge 13 is formed in the slide pieces 7*b* of the attachment portion 7 of the device body 1 to protrude toward the light emitting panel 5. Briefly, in the present embodiment, the ridge 13 is formed on the surface 8 of the device body 1. In the illumination device 20 of the present embodiment, the ridge 13 is arranged on the surfaces of the slide pieces 7*b* of the attachment portion 7 facing the light emitting panel 5 in the central areas of the slide pieces 7*b* along the sliding direction of the light emitting panel 5.

In the illumination device 20 of the present embodiment, the groove portion 9 is provided on the rear surface 15 of the panel body 2. Briefly, in the illumination device 20 of the present embodiment, the groove portion 9 for enabling the attachment portion 7 of the device body 1 to slide is provided on the surface of the light emitting panel 5 facing the device body 1. The groove portion 9 is formed on the rear surface 15 of the panel body to extend along the sliding direction of the light emitting panel 5.

The panel body 2 includes the terminal portions 12*b* of the second terminals 12 electrically connectable to the first terminals 11 of the device body 1. The terminal portions 12*b* of the second terminals 12 are provided on the opposite surfaces of the protrusions 9*b* of the groove portion 9 from the device body 1. Briefly, in the illumination device 20 of the present embodiment, the second terminals 12 electrically connectable to the first terminals 11 of the device body 1 are provided in the groove portion 9.

The terminal portions 12*b* of the second terminals 12 are separately arranged on the opposite surfaces of the protrusions 9*b* of the groove portion 9 from the device body 1 in the central areas of the protrusions 9*b* along the sliding direction of the light emitting panel 5. In other words, the terminal portions 12*b* of the second terminals 12 are arranged in the positions corresponding to the first terminals 11 when the light emitting panel 5 is attached to the device body 1. Briefly, in the illumination device 20 of the present embodiment, the first terminals 11 are arranged in such positions where the first terminals 11 can be electrically connected to the second terminals 12 when the light emitting panel 5 is attached to the device body 1.

The cover 4 includes first cutout portions 4*a* formed in the positions corresponding to the openings 9*c* of the groove portion 9 of the panel body 2 when the light emitting panel 5 is attached to the device body 1. In the illumination device 20 of the present embodiment, the first cutout portions 4*a* and the openings 9*c* make up the cutout portions 5*a*.

In the illumination device 20 of the present embodiment, the valley 14 is formed on the bottom surface of the groove portion 9 of the panel body 2. In the present embodiment, the valley 14 is arranged on the bottom surface of the groove portion 9 in the central area of the groove portion 9 along the sliding direction of the light emitting panel 5. In other words, the valley 14 is arranged in the position where the ridge 13 of the device body 1 can engage with the valley 14 when the light emitting panel 5 is attached to the device body 1. Briefly, in the present embodiment, the valley 14 engaging with the ridge 13 of the device body 1 when the light emitting panel 5 is attached to the device body 1 is formed on the rear surface 15 of the light emitting panel 5.

In the illumination device 20 of the present embodiment, the terminal portions 12*b* of the second terminals 12 are separately arranged on the opposite surfaces of the protrusions 9*b* of the groove portion 9 from the light emitting panel 5 in the central areas of the protrusions 9*b* along the sliding direction of the light emitting panel 5. However, the positions of the terminal portions 12*b* of the second terminals 12 are not limited thereto. The terminal portions 12*b* of the second terminals 12 may be arranged in any position as long as the terminal portions 12*b* of the second terminals 12 can be electrically connected to the first terminals 11 when the light emitting panel 5 is attached to the device body 1. In the illumination device 20 of the present embodiment, the ridge 13 is arranged on the surfaces of the slide pieces 7*b* of the attachment portion 7 facing the light emitting panel 5 and in the central areas of the slide pieces 7*b* along the sliding direction of the light emitting panel 5. However, the position of the ridge 13 is not limited thereto. The ridge 13 may be arranged in any position as long as the ridge 13 can engage with the valley 14 of the light emitting panel 5 when the light emitting panel 5 is attached to the device body 1. While the ridge 13 is arranged on the surfaces of the slide pieces 7*b* of the attachment portion 7 facing the light emitting panel 5 in the illumination device 20 of the present embodiment, the position of the ridge 13 is not limited thereto. While the valley 14 is arranged on, e.g., the bottom surface of the groove portion 9 in the illumination device 20 of the present embodiment, the position of the valley 14 is not limited thereto. The valley 14 may be arranged in any position on the rear surface 15 of the light emitting panel 5

In the illumination device 20 of the present embodiment described above, the rear surface 15 of the light emitting panel 5 facing the device body 1 is formed as a first curved surface. The surface 8 of the device body 1 facing the light emitting panel 5 is formed as a second curved surface conforming to the first curved surface. The attachment portion 7 for attaching/detaching the light emitting panel 5 to/from the device body 1 to slide along the first curved surface or the second curved surface is provided on the surface of the device body 1 facing the light emitting panel 5. The groove portion 9 for enabling the attachment portion 7 to slide is provided on the surface of the light emitting panel 5 facing the device body 1. It is therefore possible to enhance the ease of a work for attaching and detaching the light emitting panel 5 to and from the device body 1.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An illumination device system, comprising:

a plurality of illumination devices arranged on one plane, every two adjacent illumination devices abutting each other, wherein each of the illumination devices includes:

a light emitting panel having an electroluminescence element; and a device body to which the light emitting panel is detachably attached, wherein the light emitting panel has a rear surface facing the device body and serving as a first curved surface, the device body having a surface facing the light emitting panel and serving as a second curved surface conforming to the first curved surface, wherein an attachment portion configured to slidably attach and detach the light emitting panel to and from, respectively, the device body in a sliding direction along the first curved surface or the second curved surface is provided on one of:

the rear surface of the light emitting panel facing the device body, and the surface of the device body facing the light emitting panel, wherein a groove portion, configured such that the attachment portion slides on the groove portion, is provided on the other of:

the rear surface of the light emitting panel facing the device body, and the surface of the device body facing the light emitting panel, and wherein the light emitting panel has cutout portions provided at end portions of the light emitting panel, in the sliding direction thereof, to prevent the light emitting panel from interfering with a an adjacent illumination device when slidably detaching a light emitting panel of the adjacent illumination device from a device body of the adjacent illumination device, and wherein a first terminal for feeding electric power to the light emitting panel is provided in one of the attachment portion and the groove portion, a second terminal electrically connectable to the first terminal being provided in the other of the attachment portion and the groove portion, the first terminal being arranged in a position where the first terminal can be electrically connected to the second terminal when the light emitting panel is attached to the device body.

2. The system of claim 1, wherein a ridge is provided on one of the first curved surface of the light emitting panel and the second curved surface of the device body, a valley for engaging with the ridge, when the light emitting panel is attached to the device body, being provided on the other of the first curved surface of the light emitting panel and the second curved surface of the device body.

3. The system of claim 1, wherein the attachment portion is configured to slidably attach to the groove portion extending substantially along a length of the curved surface.

4. The system of claim 1, wherein the first curved surface has a same curvature as the second curved surface.

5. The system of claim 1, wherein the first curved surface is provided substantially at a whole of the rear surface, and the second curved surface is provided substantially at a whole of the surface of the device body facing the light emitting panel.

6. The system of claim 3, wherein the first curved surface has a same curvature as the second curved surface.

7. The system of claim 3, wherein the first curved surface is provided substantially at a whole of the rear surface, and the second curved surface is formed substantially at a whole of the surface of the device body facing the light emitting panel.

8. The system of claim 4, wherein the first curved surface is provided substantially at a whole of the rear surface, and the second curved surface is provided substantially at a whole of the surface of the device body facing the light emitting panel.

9. The system of claim 6, wherein the first curved surface is provided substantially at a whole of the rear surface, and the second curved surface is provided substantially at a whole of the surface of the device body facing the light emitting panel.

10. The illumination device system according to claim 1, the cutout portions being provided in leading and trailing end portions of the light emitting panel, in the sliding direction.

11. The illumination device system according to claim 1, the cutout portions being provided in end surfaces of the light emitting panel, the end surfaces extend in a direction transverse to the sliding direction.

12. An illumination device, comprising:

a light emitting panel having an electroluminescence element; and a device body to which the light emitting panel is detachably attached, wherein the light emitting panel has a rear surface facing the device body and serving as a first curved surface, the device body having a surface facing the light emitting panel and serving as a second curved surface conforming to the first curved surface, wherein an attachment portion configured to slidably attach and detach the light emitting panel to and from, respectively, the device body in a sliding direction along the first curved surface or the second curved surface is provided on one of:

the rear surface of the light emitting panel facing the device body, and the surface of the device body facing the light emitting panel, wherein a groove portion, configured such that the attachment portion slides on the groove portion, is provided on the other of:

the rear surface of the light emitting panel facing the device body, and the surface of the device body facing the light emitting panel, and wherein the light emitting panel has cutout portions provided at end portions of the light emitting panel, in the sliding direction thereof, the cutout portions being configured to prevent the light emitting panel from interfering with an adjacently positioned illumination device when slidably detaching a light emitting panel of the adjacently positioned illumination device from a device body of the adjacently positioned illumination device, and wherein a first terminal for feeding electric power to the light emitting panel is provided in one of the attachment portion and the groove portion, a second terminal electrically connectable to the first terminal being provided in the other of the attachment portion and the groove portion, the first terminal being arranged in a position where the first terminal can be electrically connected to the second terminal when the light emitting panel is attached to the device body.

13. The illumination device of claim 12, wherein a ridge is provided on one of the first curved surface of the light emitting panel and the second curved surface of the device body, a valley for engaging with the ridge, when the light emitting panel is attached to the device body, being provided on the other of the first curved surface of the light emitting panel and the second curved surface of the device body.

14. The illumination device of claim 12, wherein the attachment portion is configured to slidably attach to the groove portion extending substantially along a length of the curved surface.

15. The illumination device of claim 12, wherein the first curved surface is provided substantially at a whole of the rear surface, and the second curved surface is provided substantially at a whole of the surface of the device body facing the light emitting panel.

16. The illumination device of claim 12, the cutout portions being provided in leading and trailing end portions of the light emitting panel, in the sliding direction.

17. The illumination device of claim 12, the cutout portions being provided in end surfaces of the light emitting panel, the end surfaces extend in a direction transverse to the sliding direction.

* * * * *